United States Patent [19]

Campagna, Jr.

[11] 4,194,809
[45] Mar. 25, 1980

[54] MOTION REFLECTOR

[75] Inventor: James V. Campagna, Jr., North Olmsted, Ohio

[73] Assignee: Motion Reflector Industries, Inc., North Olmsted, Ohio

[21] Appl. No.: 842,281

[22] Filed: Oct. 14, 1977

[51] Int. Cl.² .............................................. G02B 5/12
[52] U.S. Cl. .................... 350/97; 116/28 R; 350/99
[58] Field of Search .................. 350/97, 99, 107, 109, 350/103, 106; 40/116; 404/15; 248/205 R; 280/289 R; 116/28 R

[56] References Cited

U.S. PATENT DOCUMENTS

| | | | |
|---|---|---|---|
| 3,438,651 | 4/1969 | Hertoghe et al. | 350/97 |
| 3,875,890 | 4/1975 | La Cava et al. | 350/99 |
| 3,907,404 | 9/1975 | McEwin | 350/97 |
| 3,951,516 | 4/1976 | Rihm | 350/99 |
| 3,990,664 | 11/1976 | Horvath et al. | 350/97 |

FOREIGN PATENT DOCUMENTS

| | | | |
|---|---|---|---|
| 807492 | 7/1949 | Fed. Rep. of Germany | 350/99 |
| 447025 | 5/1936 | United Kingdom | 350/97 |
| 936465 | 9/1963 | United Kingdom | 350/99 |

*Primary Examiner*—John K. Corbin
*Assistant Examiner*—B. de los Reyes
*Attorney, Agent, or Firm*—Fleischner, Schutz and Henn

[57] ABSTRACT

An attachment for objects provides improved safety by affording increased visibility under a wide range of conditions of ambient illumination. The attachment comprises a device mounted on resilient means affixed to an object which can have some independent motion; the motion of the object is transmitted to the device through the resilient means. The device has dark, reflective light-colored, and fluorescent areas. In one embodiment, the dark, reflective light-colored and fluorescent areas are disposed on a lenticular material, the movement of which causes the appearance of exaggerated movement of the object to which the device is affixed.

2 Claims, 4 Drawing Figures

MOTION REFLECTOR

BACKGROUND OF THE INVENTION

This invention is in the field of safety attachments, and more particularly relates to reflectors for providing greater capability of attracting attention under widely varying conditions of ambient or incident light.

It is known in the art to affix devices to objects for the purpose of enhancing the visibility of the object. Thus, reflecting taillight lenses on automobiles are required in every state, and reflective devices are known for placement on the road to warn of disabled vehicles.

While the various devices which are known have merit for the function they perform, most of them are stationary devices having no independent motion; and although the lack of independent motion is not a drawback in itself, neither does it add any value to the reflector, nor aid in any way in drawing attention to the object, other than by the reflection of incident illumination.

For example, if an automobile is by the side of the road, the headlights of a car approaching from the rear will produce a reflection from the taillights. However, except for that reflected light, nothing in or about the lens serves to attract attention, and the stationary light is as easy to overlook as a reflection from a discarded bottle or can.

The same considerations apply to such things as bicycles and other small vehicles, with perhaps additional force. For some reason, many motorists fail to see anything smaller than another automobile on the road, and collisions between motorcycles or bicycles and automobiles occur too often because the driver of the automobile has simply failed to see the cyclist, especially from directly to the front or the rear.

One approach to the problem has been to provide bicycles, specifically, with reflectors on the spokes of the wheel, and with reflectors on the pedals. These measures have been effective in increasing the visibility of a bicycle at night, because automobiles generally operate with their headlights on, and the beam is reflected back to the driver by the reflectors attached to the bicycle.

However, under conditions where the automobile may be operated without the headlights, such as the early evening or late dawn hours, or in cloudy weather, the attached reflectors are substantially ineffective. In a similar fashion, the reflectors are of little or no value under conditions of normal illumination, such as sunlight or light clouds which may obscure the sun without substantially diminishing the ambient illumination. In such cases, the cyclist takes his chances on being seen or not being seen, based only on the cycle itself.

In order to overcome this latter problem, many bicyclists, although virtually no motorcylists, employ a brightly colored flag at the end of a long flexible rod affixed to the bicycle; when the cyclist is peddling, the slight back-and-forth motion imparted to the bicycle by the cyclist's legs is amplified by the rod, causing the flag to whip slightly, irrespective of wind conditions. The attention of the operator of a motor vehicle is more readily attracted to this motion, and the safety of the cyclist is thereby enhanced. However, the flag device is of little practical value in the dark or under reduced illumination, and necessarily imparts an undesirable, if slight, drag to the bicycle due to wind resistance.

It would therefore be desirable for improved safety to slow-moving or small vehicles or objects to provide a device which would attract attention to such an object in time to prevent emergency situations from arising.

SUMMARY OF THE INVENTION

The present invention is an improvement for safety attachments which provides for increased visibility under widely varying conditions of ambient illumination. More particularly, the present invention is a reflector which affords a changing appearance and which has additional motion imparted thereto by the use of resilient mounting means. The reflector surface has non-reflective dark areas adjacent to highly reflective light-colored areas; fluorescent colored areas are juxtaposed on the reflector surface. The reflector has reflective surfaces on at least the face and sides thereof, and has fluorescent colored areas on at least two surfaces.

The reflector of the present invention is designed for maximum visibility under all lighting conditions. When there is substantial illumination, such as on a sunny day, the whole reflector will be visible, particularly the dark next to the white or light-colored areas. Under cloudy conditions, the fluorescent colored areas will be more visible. In the dark, the white or light-colored, highly reflective areas will be visible due to reflection from available light sources such as, e.g., automobile headlights.

It is thus an object of the present invention to provide a device for imparting enhanced visibility to small, slow-moving vehicles or other objects; it is another object of this invention to provide improved visibility for objects under widely variant conditions of ambient illumination; it is a still further object of this invention to provide a device for improved safety; it is yet another object of this invention to provide a simple and compact reflector and warning device; it is an object of this invention to provide any one or more of the foregoing objects. These and other objects will become apparent to those skilled in the art upon consideration of the accompanying specification, claims and drawings.

DESCRIPTION OF THE PREFERRED EMBODIMENTS

Figure 1:
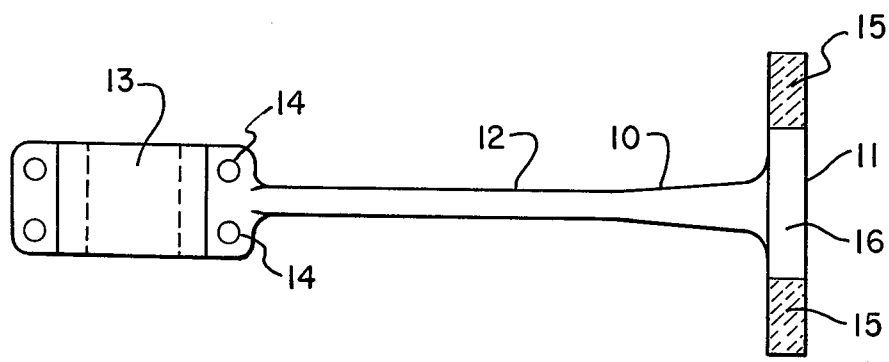
FIG. 1 is a side view of one embodiment of the present invention.

The present invention is a safety attachment, more particularly an improved reflector which provides increased visibility under all lighting conditions. This invention will be understood by reference to the drawing Figures.

FIG. 1 shows a side view of one embodiment of the present invention 10. A reflecting device 11 is attached to the desired object by a flexible attachment means 12. This flexible attachment means must be stiff enough to support the reflector surface without substantial deformation, and yet be flexible enough to bend during motion of the object upon which the reflector is mounted.

In this way, not only is the motion of the object translated to the surface of the reflector, but the additional motion caused by the oscillation of the flexible attachment means is also translated to the reflector surface. Therefore, the attention of a likely viewer of the reflector will further be attracted. The flexible attachment means 12 shown in FIG. 1 is formed of a plastic material such as, e.g., polyamide, isotactic polypropylene; polytetraflouroethylene or the like. The means 12 is further connected to a means to attach it to the object upon which the reflector is mounted. One such means shown in FIG. 1 is a strap or band 13 which is integral with flexible attachment means 12. Strap 13 is shown with holes 14 for use with screws, rivets or the like.

Figure 2:
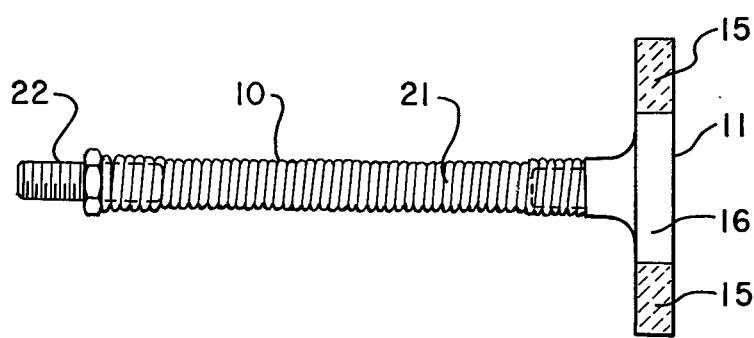
FIG. 2 is a side view of another embodiment of the present invention, showing an alternative resilient mounting means.

As shown in FIG. 2, the flexible attachment means and the means to attach it to the object upon which the reflector is mounted can be several separate pieces connected together, rather than the one unit containing the entire device such as the integral molded plastic spring and clamp as shown in FIG. 1; in FIG. 2, the reflective device or reflector 11 is connected to a coil spring 21, which is affixed to a mounting means shown as stud 22.

On the side surface of the reflector, as shown in both FIGS. 1 and 2, at least one portion 15 is a fluorescent bright color, and at least one other portion 16 is a reflective material in a light color. This arrangement, and choice of colors and materials, affords a high degree of visibility to the device under conditions of lowered illumination. The additional movement imparted to the reflector 11 causes it to attract attention by the reflected image.

Figure 3:
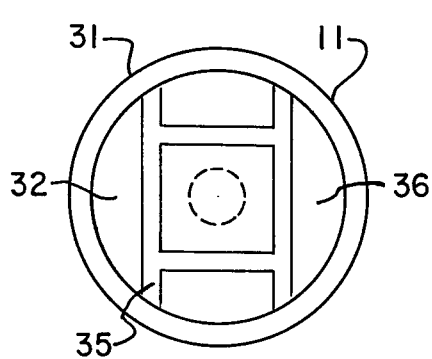
FIG. 3 is a plan view of the reflective surface of the present invention, showing dark, reflective and fluorescent areas.

One embodiment of the reflector 11 is shown in FIG. 3. This particular embodiment is circular in shape, with a non-reflecting black or dark-colored circle 31 upon the surface 32 and adjacent to the edge thereof. There are at least two areas disposed within the circle 31. A first area 35 is of a highly visible fluorescent color, such as red, yellow, orange or green. Such colors are well known in the art, and one example is "Day-Glo" colors, marketed under that trademark by Switzer Bros., Inc. A second area 36 is white or a light color and has a highly reflective surface, such that incident light is reflected almost entirely. Such reflective material is well known in the art; one material of this type is described in U.S. Pat. No. 3,493,403, and is further known as "Scotchlite", marketed under that trademark by the 3M Company. It should be noted that the circular device shown in FIGS. 3 and 4 is typical only; the form of the device can be of many different shapes.

Figure 4:
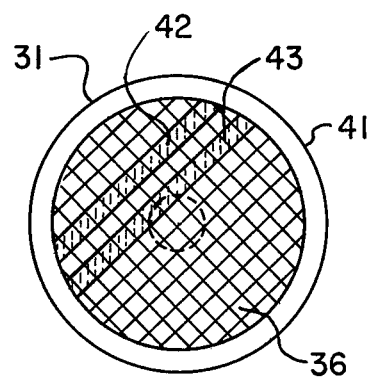
FIG. 4 is a plan view of the reflective surface of the present invention, showing a lenticular embodiment.

A further embodiment of the present invention can be made of lenticular material 41, as shown in FIG. 4. A lenticule is defined as "any of the minute lenses produced (as by embossing) on the base side of a photographic film, serving to record elements of two or more photographic images, and used in stereoscopic or color photography.", by Grove, P.B., *Webster's Third New International Dictionary*, p, 1294 (1971). As used herein, the term "lenticule" also includes any of the minute lenses on one or both sides of a supporting material, upon which lenses there can be disposed a fluorescent highly reflective or colored material of random or ordered design, or without a design. This type of material is known in the art; one example is "Vari-Vu", marketed under that trademark by Plasticad, Inc. A lenticular material having at least two images is preferably used. A plurality of images of the type described above and shown in FIG. 3 can be placed on the same reflector. The motion of the reflector or of the viewer will continually change the angle at which the viewer will see the surface of the reflector. The viewer will therefore see different images in succession. This change of image will make any motion of the reflector even more apparent than its own real motion. Additionally, images can easily be designed which will give the appearance of exaggerated motion as the viewer sees first one image and then another image. Each image can have a background suitable for, e.g., words of caution or advertising.

In FIG. 4, first area 42 is disposed to be visible to a viewer when observing the device from, e.g., slightly to the right, while second area 43 is disposed to be invisible to the viewer in that aspect. When the effective aspect of the object changes, by motion of either the device or the viewer, areas 42 and 43 appear to jump back and forth, creating the appearance of exaggerated movement out of proportion to the actual relative motion of the device or the viewer. Area 36 is a highly reflective light color. It should be noted that the relative positions of areas 36, and 42 and 43, can be interchanged.

As described in connection with FIG. 3, the lenticular device can have a dark-colored area shown as circle 31; by making areas 42 and 43 of a highly visible fluorescent color, an effect similar to that of the device of FIG. 3 is created, with additional apparent motion being displayed.

It has been determined that the motion reflector works most effectively when the rest position of the reflective device is substantially perpendicular to the horizontal plane. In this fashion, the reflector mounted on a bicycle would present the greatest exposure to, e.g., automobile headlights. It is therefore preferable to dispose the motion reflector upon the object sought to be protected such that the deformation of the flexible attachment means permits the reflector to maintain a substantially vertical aspect.

For enhanced visibility of the device from all directions, the rear surface can have dark, reflective and fluorescent areas similar to those on the face and sides.

Modifications, changes and improvements to the forms of the invention herein disclosed, described and illustrated may occur to those skilled in the art who come to understand the principles and precepts thereof. Accordingly, the scope of the patent to be issued hereon should not be limited to the particular embodiment of the invention set forth herein, but rather should be limited by the advance by which the invention has promoted the art.

What is claimed is:

1. A motion reflector for improved safety which comprises:
   (A) a reflecting device having disposed at the edge thereof at least one first non-reflective, dark-colored area and at least one first highly visible area of a fluorescent color, the reflecting device being made of a lenticular material, the first highly visible area of a fluorescent color being disposed to be viewed in one aspect, and a second highly visible area of a fluorescent color being disposed to be viewed in another aspect;
   (B) flexible metal attachment means affixed to the reflecting device; and
   (C) means for affixing the attachment means to an object.

2. The motion reflector of claim 1 wherein said areas of fluorescent color are bands of fluorescent color.

* * * * *